United States Patent
Teyeb et al.

(10) Patent No.: US 12,200,794 B2
(45) Date of Patent: Jan. 14, 2025

(54) HANDLING RE-ESTABLISHMENT REJECTION

(71) Applicant: Telefonaktiebolaget LM Ericsson (publ), Stockholm (SE)

(72) Inventors: Oumer Teyeb, Solna (SE); Gunnar Mildh, Sollentuna (SE); Alessio Terzani, Stockholm (SE); Icaro L. J. Da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 535 days.

(21) Appl. No.: 17/054,013

(22) PCT Filed: May 8, 2019

(86) PCT No.: PCT/IB2019/053779
§ 371 (c)(1),
(2) Date: Nov. 9, 2020

(87) PCT Pub. No.: WO2019/215634
PCT Pub. Date: Nov. 14, 2019

(65) Prior Publication Data
US 2021/0243832 A1    Aug. 5, 2021

Related U.S. Application Data

(60) Provisional application No. 62/669,891, filed on May 10, 2018.

(51) Int. Cl.
H04W 76/18    (2018.01)
H04W 76/19    (2018.01)

(52) U.S. Cl.
CPC .......... *H04W 76/18* (2018.02); *H04W 76/19* (2018.02)

(58) Field of Classification Search
CPC . H04W 76/10; H04W 36/0033; H04W 76/18; H04W 76/19; H04W 76/27; H04W 48/04; H04W 28/08
See application file for complete search history.

(56) References Cited

U.S. PATENT DOCUMENTS 8,565,099 B2 * 10/2013 Lindstrom ............ H04W 76/18
370/242
8,868,080 B2 * 10/2014 Wang ................ H04W 36/0007
455/437

(Continued)

FOREIGN PATENT DOCUMENTS

EP    3258735 A1 * 12/2017 ............ H04W 24/10
WO    2013 077622 A1    5/2013

OTHER PUBLICATIONS

A post-failure recovery scheme over pre-allocated backup resource for elastic optical networks, Singh et al., Optical Fiber Technology, Materials, Devices and Systems. (Year: 2018).*

(Continued)

*Primary Examiner* — Redentor Pasia
(74) *Attorney, Agent, or Firm* — Baker Botts L.L.P.

(57) ABSTRACT

A method by a network node is provided for handling a re-establishment request. The method includes receiving, from a wireless device, a first request for re-establishment of a connection with the network node in a first cell. The network node determines that a load on the network node exceeds a threshold amount. In response to determining that the load on the network node exceeds the threshold amount, the network node ignores the first request for re-establishment.

16 Claims, 13 Drawing Sheets

(56) References Cited

U.S. PATENT DOCUMENTS

| | | | |
|---|---|---|---|
| 10,334,653 B2* | 6/2019 | Hahn | H04W 48/16 |
| 2005/0124353 A1* | 6/2005 | Cave | H04W 72/085 |
| | | | 455/453 |
| 2008/0008127 A1* | 1/2008 | Choi | H04J 11/0069 |
| | | | 370/331 |
| 2008/0039106 A1* | 2/2008 | Wallentin | H04W 76/19 |
| | | | 455/450 |
| 2009/0312007 A1* | 12/2009 | Kallio | H04W 76/19 |
| | | | 455/422.1 |
| 2009/0318199 A1* | 12/2009 | Barreto | H04W 76/38 |
| | | | 455/574 |
| 2011/0096671 A1* | 4/2011 | Lindstrom | H04W 76/18 |
| | | | 370/242 |
| 2011/0207485 A1* | 8/2011 | Dimou | H04W 36/0079 |
| | | | 455/507 |
| 2012/0040669 A1* | 2/2012 | Boley | H04W 76/27 |
| | | | 455/435.1 |
| 2012/0236707 A1 | 9/2012 | Larsson et al. | |
| 2012/0264416 A1* | 10/2012 | Pica | H04W 76/27 |
| | | | 455/422.1 |
| 2015/0173074 A1* | 6/2015 | Zhao | H04W 74/085 |
| | | | 370/336 |
| 2015/0249950 A1* | 9/2015 | Teyeb | H04W 48/04 |
| | | | 455/437 |
| 2015/0304904 A1* | 10/2015 | Li | H04W 76/19 |
| | | | 455/436 |
| 2016/0255458 A1* | 9/2016 | Huang | H04W 48/20 |
| | | | 370/338 |
| 2017/0063595 A1* | 3/2017 | Ma | H04W 72/04 |
| 2017/0171784 A1* | 6/2017 | Mitsui | H04W 76/18 |
| 2017/0238198 A1* | 8/2017 | Shibayama | H04W 76/20 |
| | | | 370/225 |
| 2017/0273007 A1* | 9/2017 | Jung | H04W 48/06 |
| 2017/0367047 A1* | 12/2017 | Fujishiro | H04W 8/22 |
| 2018/0092006 A1* | 3/2018 | Sitton | H04W 76/19 |
| 2018/0167839 A1* | 6/2018 | Jung | H04W 28/0838 |
| 2019/0037635 A1* | 1/2019 | Guo | H04W 76/27 |
| 2019/0200265 A1* | 6/2019 | Yu | H04W 36/0033 |
| 2019/0387566 A1* | 12/2019 | Huang | H04W 76/19 |
| 2020/0383162 A1* | 12/2020 | Cai | H04W 36/0079 |
| 2021/0168678 A1* | 6/2021 | Deenoo | H04W 76/19 |

OTHER PUBLICATIONS

3GPP TR 37.868 v1.1.0; Technical Report; 3rd Generation Partnership Project; Technical Specification Group Radio Access Network; Study on RAN Improvements for Machine-type Communications; (Release 10)—Aug. 2011.

PCT International Search Report issued for International application No. PCT/IB2019/053779—Sep. 11, 2019.

PCT Written Opinion of the International Searching Authority issued for International application No. PCT/IB2019/053779—Sep. 11, 2019.

* cited by examiner

HANDLING RE-ESTABLISHMENT REJECTION

PRIORITY

This nonprovisional application is a U.S. National Stage Filing under 35 U.S.C. § 371 of International Patent Application Serial No. PCT/IB2019/053779 filed May 8, 2019 and entitled "HANDLING RE-ESTABLISHMENT REJECTION" which claims priority to U.S. Provisional Patent Application No. 62/669,891 filed May 10, 2018 both of which are hereby incorporated by reference in their entirety.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In LTE, the Radio Resource Control (RRC) protocol is used to configure/setup and maintain the radio connection between the user equipment (UE) and the eNodeB (eNB). When the UE receives an RRC message from the eNB, it will apply the configuration. The term "compile" may also be used to refer to the application of the configuration. If the application of the configuration succeeds, the UE generates an RRC complete message that indicates the transaction identifier (ID) of the message that triggered this response.

Since LTE-release 8, three Signaling Radio Bearers (SRBs), namely SRB0, SRB1 and SRB2 have been available for the transport of RRC and Non Access Stratum (NAS) messages between the UE and eNB. A new SRB, known as SRB1bis, was also introduced in rel-13 for supporting Data Over NAS (DoNAS) in NB-IoT.

SRB0 is for RRC messages using the common control channel (CCCH) logical channel, and it is used for handling RRC connection setup, RRC connection resume and RRC connection re-establishment. Once the UE is connected to the eNB (i.e. RRC connection setup or RRC connection reestablishment/resume has succeeded), SRB1 is used for handling RRC messages (which may include a piggybacked NAS message) as well as for NAS messages prior to the establishment of SRB2, all using dedicated control channel (DCCH) logical channel.

SRB2 is for RRC messages which include logged measurement information as well as for NAS messages, all using DCCH logical channel SRB2 has a lower priority than SRB1, because logged measurement information and NAS messages can be lengthy and could cause the blocking of more urgent and smaller SRB1 messages. SRB2 is always configured by E-UTRAN after security activation.

In LTE, a UE initiates the RRC Connection Re-establishment procedure when one of the following happens:

upon detecting radio link failure,
upon handover failure,
upon mobility from E-U IRA failure,
upon integrity check failure indication from lower layers,
upon an RRC connection reconfiguration failure The purpose of this procedure is to re-establish the RRC connection, which involves the resumption of SRB1 (SRB1bis for a NB-IoT UE for which AS security has not been activated) operation, the re-activation of security (except for a NB-IoT UE for which AS security has not been activated) and the configuration of only the PCell (i.e. CA or DC operations are not re-established).

The connection re-establishment succeeds only if the concerned cell is prepared such as, for example, where the concerned cell has a valid UE context. In case E-UTRAN accepts the re-establishment, SRB1 operation resumes while the operation of other radio bearers remains suspended. If AS security has not been activated, the UE does not initiate the procedure but instead moves to RRC_IDLE directly.

E-UTRAN applies the procedure as follows:
when AS security has been activated:
to reconfigure SRB1 and to resume data transfer only for this RB;
to re-activate AS security without changing algorithms.
for a NB-IoT UE supporting RRC connection re-establishment for the Control Plane CIoT EPS optimisation, when AS security has not been activated: and
to re-establish SRB1bis and to continue data transfer for this RB.

FIG. 1 illustrates a RRC connection re-establishment procedure flow where the procedure is successful. FIG. 2 illustrates a RRC connection re-establishment procedure flow when the procedure fails.

The UE starts a timer T311 when it detects a RLF and starts searching for a suitable cell to camp on. If no suitable cell is found before this timer expires, the re-establishment procedure is not initiated and instead the UE has to go through the normal IDLE to CONNECTED transition (i.e. RRC Connection Request). If a suitable cell is found before the T311 expires, the UE starts the T301 timer and sends the re-establishment request.

In RAN2 101bis meeting, the NR RRC connection re-establishment was discussed. The following arguments were considered:

There is no fundamental reason why the UE cannot re-establish PDCP for SRB1 and resume SRB1 in the DL before submitting MSG3 to lower layers. This would make it possible to use SRB1 for MSG4 instead of SRB0, which would in turn make it possible to send subsequent RRC reconfiguration message in conjunction with MSG4 or directly after instead of waiting for the UE response in MSG5. Which would save a rountrip in the re-establishment of DRBs.

It would also be possible to support faster NAS recovery in the RAN in the case the RAN is not able to re-establish the UE context. This could be done by the network sending an RRC connection setup message on SRB0 (instead of a RRC re-establishment reject) which could be used to initiate normal RRC connection setup.

Based on these arguments, the following was agreed:

Re-establishment kind message is sent on SRB1 (with at least integrity protection) with the intention to allow re-establishment of DRBs without the network having to wait for the reception of re-establishment complete message.

Network can respond to the Reestablishment Request kind message with an RRC connection setup in case of RRC re-establishment failure.

FIGS. 3 and 4 illustrate the NR re-establishment procedure based on the above-described agreements. Specifically, FIG. 3 illustrates a successful NR RRC connection re-establishment, and FIG. 4 illustrates a successful NR RRC re-establishment with fallback to RRC establishment.

There currently exist certain challenge(s). For example, the re-establishment procedure may fail if the cell/node receiving the request from UE is not prepared to handle the re-establishment, e.g. no UE context is found.

In LTE, to cope with failures in the re-establishment procedure, EU IRAN may send an RRCConnectionReestablishmentReject message. Upon the reception of that message, the UE would enter RRC_IDLE and perform NAS recovery. The UE would most likely keep camping on the same cell and perform an additional random access to perform a transition from RRC_IDLE to RRC_CONNECTED. Notice that this time, as the UE has entered RRC_IDLE, the UE would perform access control to check whether the cell is barred or not. Hence, rejecting the re-establishment in LTE could achieve some sort of protection in case of overload. Or, if the reason for rejecting the UE was that the UE context could not be identified or retrieved, performing NAS recovery would lead to a transition from RRC_IDLE to RRC_CONNECTED, enabling the UE to re-store the context.

As discussed above, it has been agreed in RAN2 101bis, that in case the UE context is not found the network can reply with RRCSetup immediately, speeding up the NAS recovery in the RAN by avoiding an additional random access.

SUMMARY

Certain aspects of the present disclosure and their embodiments may provide solutions to these or other challenges. Specifically, various methods are disclosed for handling re-establishment rejection in NR.

According to certain embodiments, a method by a network node is provided for handling a re-establishment request. The method includes receiving, from a wireless device, a first request for re-establishment of a connection with the network node in a first cell. The network node determines that a load on the network node exceeds a threshold amount. In response to determining that the load on the network node exceeds the threshold amount, the network node ignores the first request for re-establishment.

According to certain embodiments, a network node is provided for handling a re-establishment request. The network node includes memory storing instructions and processing circuitry configured to execute the instructions to cause the network node to receive, from a wireless device, a first request for re-establishment of a connection with the network node in a first cell. A determination is made as to whether a load on the network node exceeds a threshold amount. In response to determining that the load on the network node exceeds the threshold amount, the first request for re-establishment is ignored.

Certain embodiments may provide one or more of the following technical advantage(s). For example, a technical advantage of certain embodiments may be that overloading of an eNB/gNB may be avoided when many UEs are performing RRC Re-establishment. Example scenarios may include when an eNB/gNB experiences a short-lived problem in its transmitter or when a neighbor base station is experiencing some problems. Either scenario may lead to a flood of UEs experiencing Radio Link Failure. All of these UEs may then perform RRC Re-establishment at the same time, overloading the target gNB/eNB. However, certain embodiments proposed herein make it possible to handle the congestion without causing disturbance to other services or UEs.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
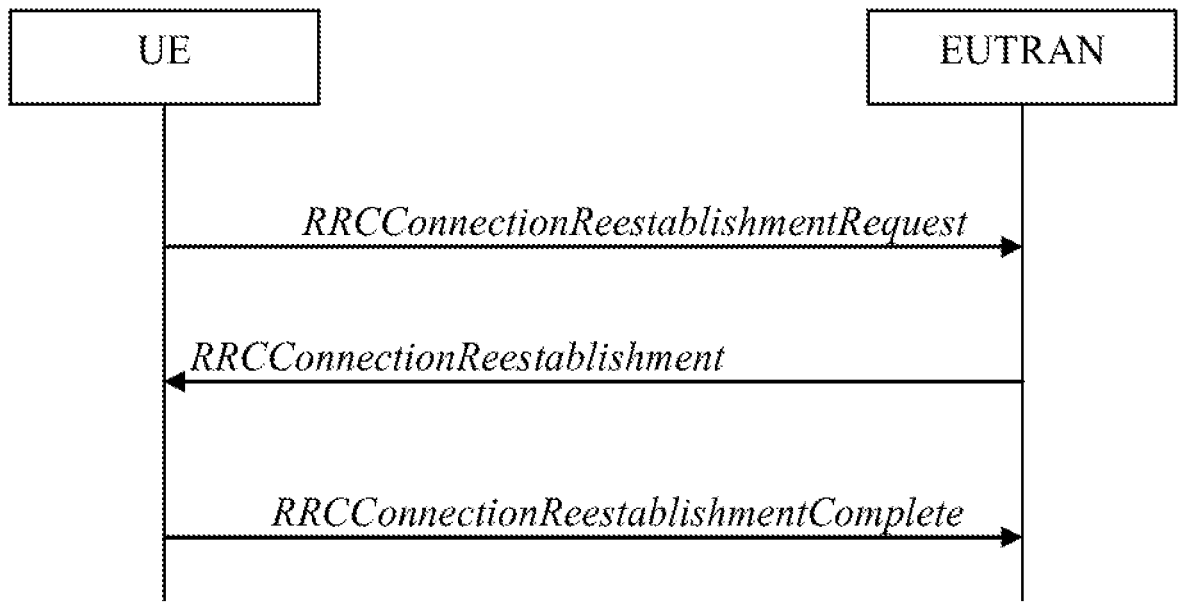
FIG. 1 illustrates a RRC connection re-establishment procedure flow where the procedure is successful.
Figure 2:
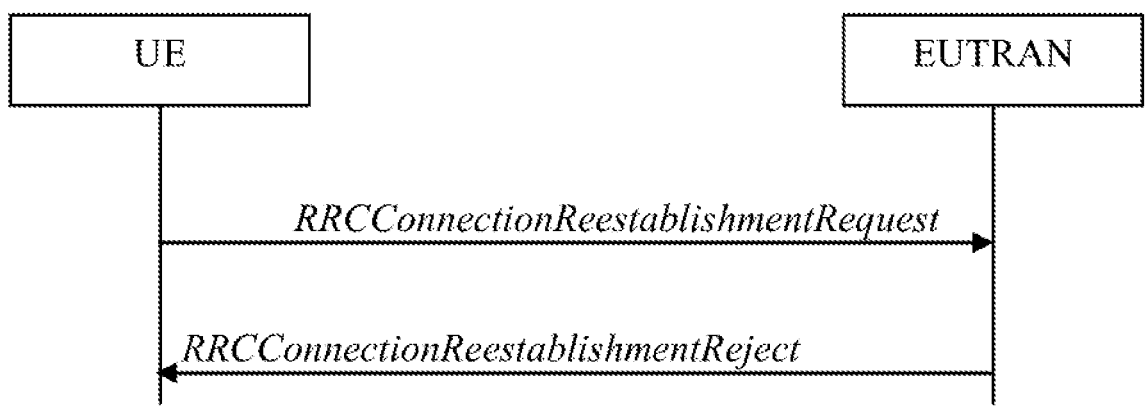
FIG. 2 illustrates a RRC connection re-establishment procedure flow when the procedure fails.
Figure 3:
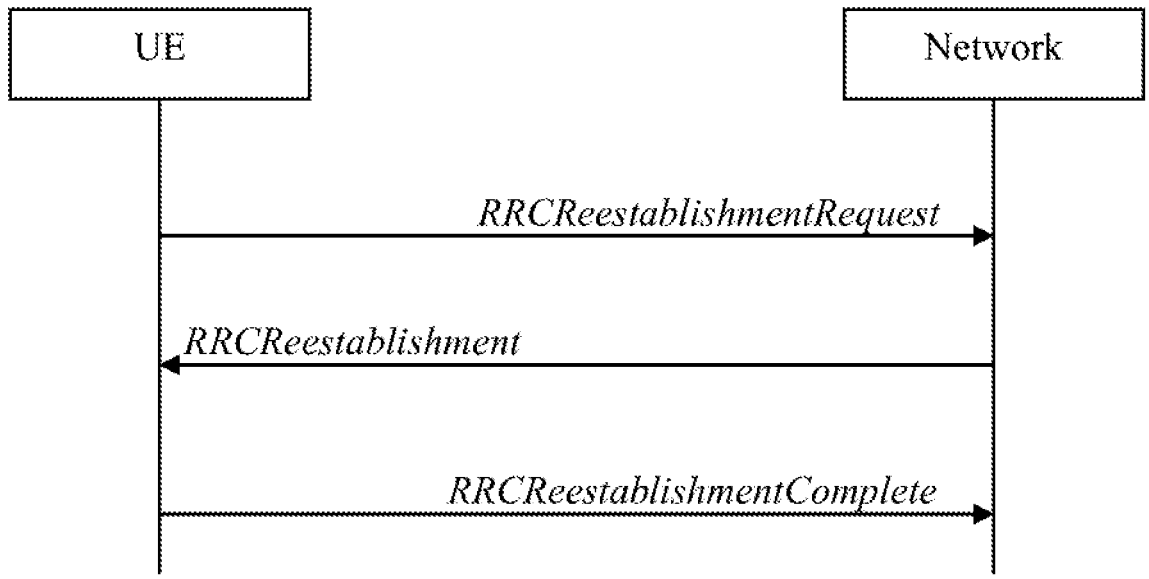
FIG. 3 illustrates a successful NR RRC connection re-establishment.
Figure 4:
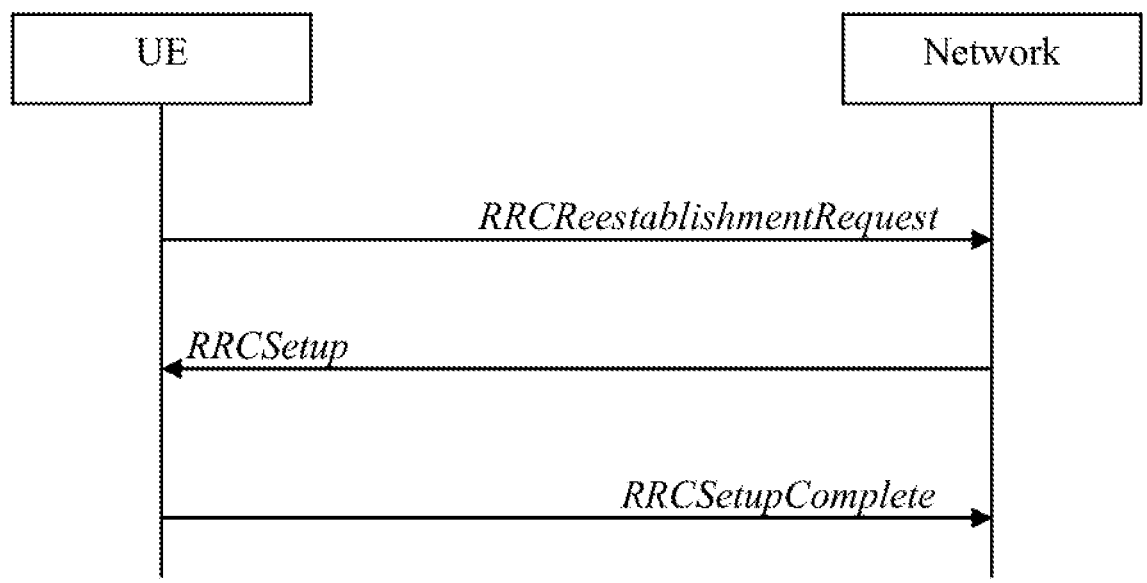
FIG. 4 illustrates a successful NR RRC re-establishment with fallback to RRC establishment.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Specifically, this disclosure proposes several ways in which a UE is prevented from re-establishing in a target NR node/cell. The proposed methods can be categorized as (A) methods requiring the introduction of a reject message and (B) methods that don't require a reject message.

A. Methods Requiring the Introduction of an NR RRCReestablishmentReject Message

According to certain embodiments, the proposed method includes introduction of a re-establishment reject:
- as in LTE, where the UE goes via IDLE, and thus will have to go through access barring check
- a modified version of re-establishment reject with a wait timer According to certain embodiments, for example, the network may send an NR RRCReestablishmentReject message when it does not want the UE to re-establish the connection for various reasons such as load control. This may cause the UE to go to IDLE where it will be subject to other Access Control mechanism (access barring check). The reject message could also contain a wait timer configuration/information which will prevent the UE from accessing the same cell for a period of time. In a particular embodiment, the RRCReestablishmentReject message may be sent via SRB0. In another particular embodiment, the RRCReestablishmentReject message may be sent via SRB1. In a particular embodiment, the message may use integrity protection and/or ciphering. In yet another particular embodiment, the RRCReject message is used to also reject re-establishments.

From the UE's side, for example, upon receiving an RRCReestablishmentReject, the UE may immediately go to IDLE mode and perform NAS recovery (i.e. initiate the RRCSetup procedure). When doing this, the UE may be subject to other access control mechanisms such an Access Barring check (based on broadcasted parameters). In a particular embodiment, upon receiving an RRCReestablishmentReject, the UE may try to find another suitable cell and perform the re-establishment to that cell instead.

According to other embodiments, an optional wait timer may be introduced in the RRCReestablishmentReject. During the wait time, the UE may be prevented from accessing the system/network. Accordingly, upon receiving an RRCReestablishmentReject that includes a wait timer, the UE may wait until the timer expires and then tries to perform the re-establishment again. In another particular embodiment, upon receiving an RRCReestablishmentReject that includes a wait timer, the UE may try to find another suitable cell (either intra-frequency or inter-frequency) and try to perform re-establishment to that cell. If the wait timer expires before the UE succeeds to re-establish the connection, the UE will try to perform the re-establishment towards the original cell that rejected it.

According to still other embodiments, an optional alternative cell or frequency indication may be introduced in the RRCReestablishmentReject. For example, the network node that received the re-establishment request may want to re-direct the UE to a less overloaded cell or/and frequency layer). Accordingly, upon receiving an RRCReestablishmentReject that includes an alternative cell and/or frequency indication, the UE may try to find another suitable cell (either intra-frequency or inter-frequency that fulfils the indication received) and try to perform re-establishment to that cell instead.

It should be noted that the wait timer and alternative indications in the embodiments described above can be combined in one message, in a particular embodiment.

Additionally, it may be noted that the RRCReject message may be used instead of the RRCReestablishmentReject in any of the above embodiments.

B. Methods not Requiring the Introduction of an NR RRCReestablishmentReject Message According to certain other embodiments, the proposed method may not include introduction of a re-establishment reject:
- introduce access barring check also before trying to re-establish (which may need a definition of access barring probabilities/timers for the re-establishing UEs)
- rely on the expiry of timer T301 (i.e. implicit reject), which will force the UE to go to IDLE For example, according to certain embodiments, a new access barring class and associated reject probability and wait time parameters may be defined for handling re-establishments. In a particular embodiment, the new access barring class and parameters are broadcasted via system information. In another embodiment, the new access barring class and parameters may be given to a connected UE via dedicated RRC signalling.

According to certain embodiments, before sending a re-establishment request, the UE may perform access barring check, the same way it does for connection setup request, using the access barring parameters associated with re-establishment.

In a particular embodiment, the UE may use the re-establishment access barring parameters that it has received via dedicated signalling when it was in connected mode (i.e. before RLF). In another particular embodiment, the UE may use the re-establishment access barring parameters that it gets from reading the broadcasted system information in the target cell. In still another particular embodiment, if there is no broadcasted re-establishment access barring parameter in the target cell, the UE will not apply any dedicated re-establishment parameters that it may have received in the cells where it was connected before.

According to certain embodiments, if the network doesn't want to accept the re-establishment for load or other related issue, the network node may simply ignore the re-establishment request from the UE. The network may also abstain from performing any signalling to the UE at all, in order not to add congestion, in a particular embodiment.

According to certain embodiments, upon T301 expiry, the UE may start connection establishment such as, for example, by initiating the RRCSetup procedure. When the UE performs connection establishment, the UE may be subject to other access control mechanisms such as, for example, access barring as described below.

In a particular embodiment, the UE may inform upper layers that re-establishment has failed before initiating the connection establishment procedure.

In a particular embodiment, the UE may perform normal IDLE to CONNECTED mode access barring check.

In a particular embodiment, instead of performing the connection setup towards the same cell that didn't respond to the re-establishment request, the UE may try to re-establish to the next suitable cell.

In a particular embodiment, the UE may start multiple re-establishment requests to several candidate cells and may resume the connection towards the first cell to respond to the re-establishment and ignores all subsequent responses from the other cells.

Figure 5:
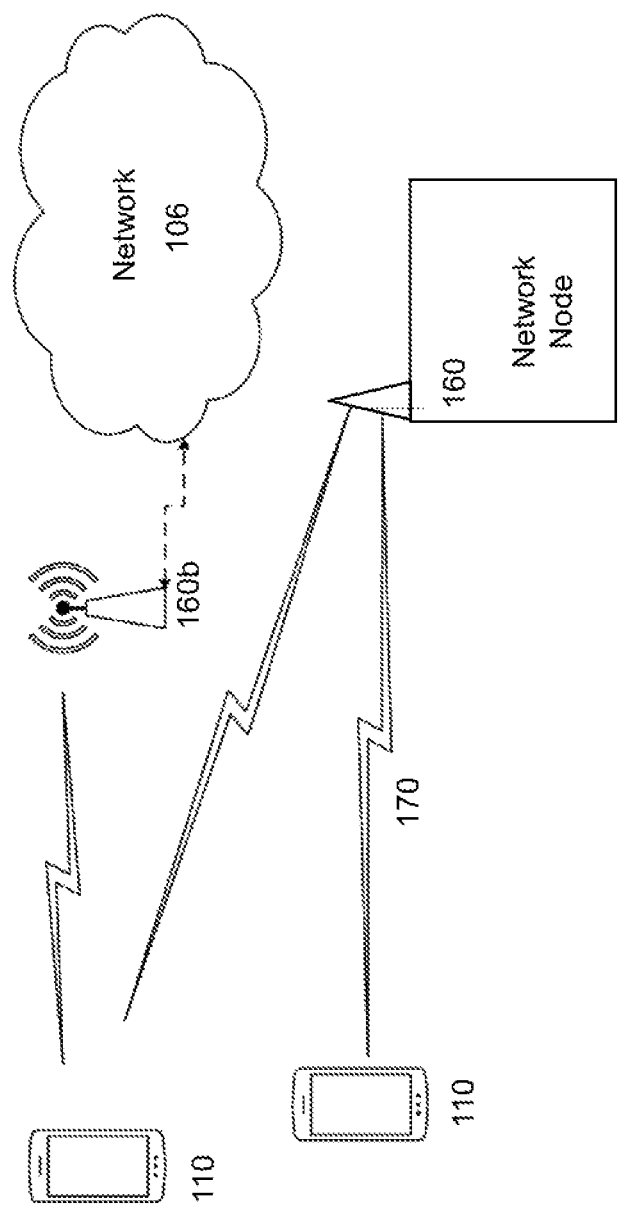
FIG. 5 illustrates an example wireless network for controlling adaptive beam measurement capability, according to certain embodiments.

FIG. 5 illustrates an example wireless network in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
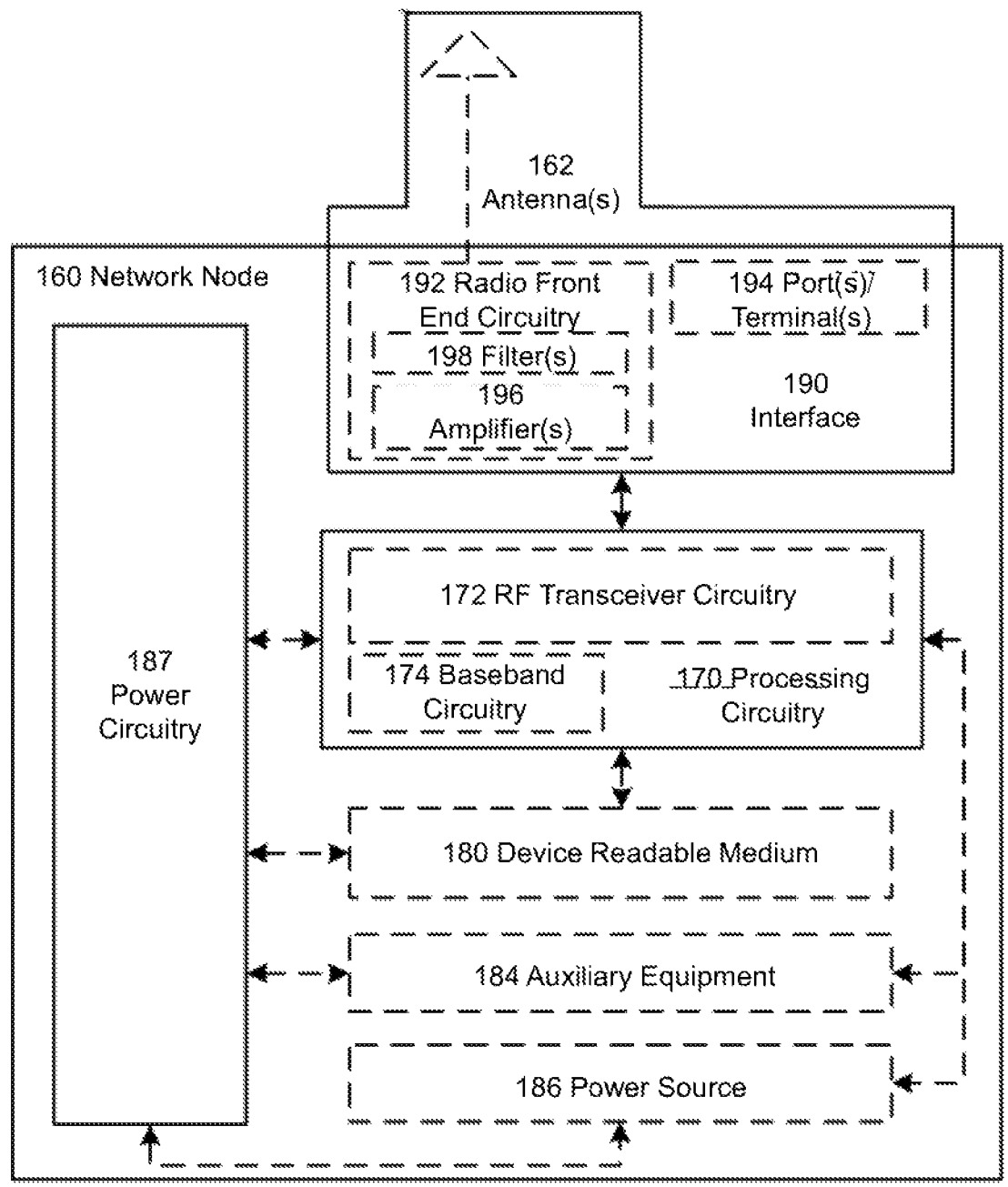
FIG. 6 illustrates an example network node for controlling adaptive beam measurement capability, according to certain embodiments.

FIG. 6 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 7:
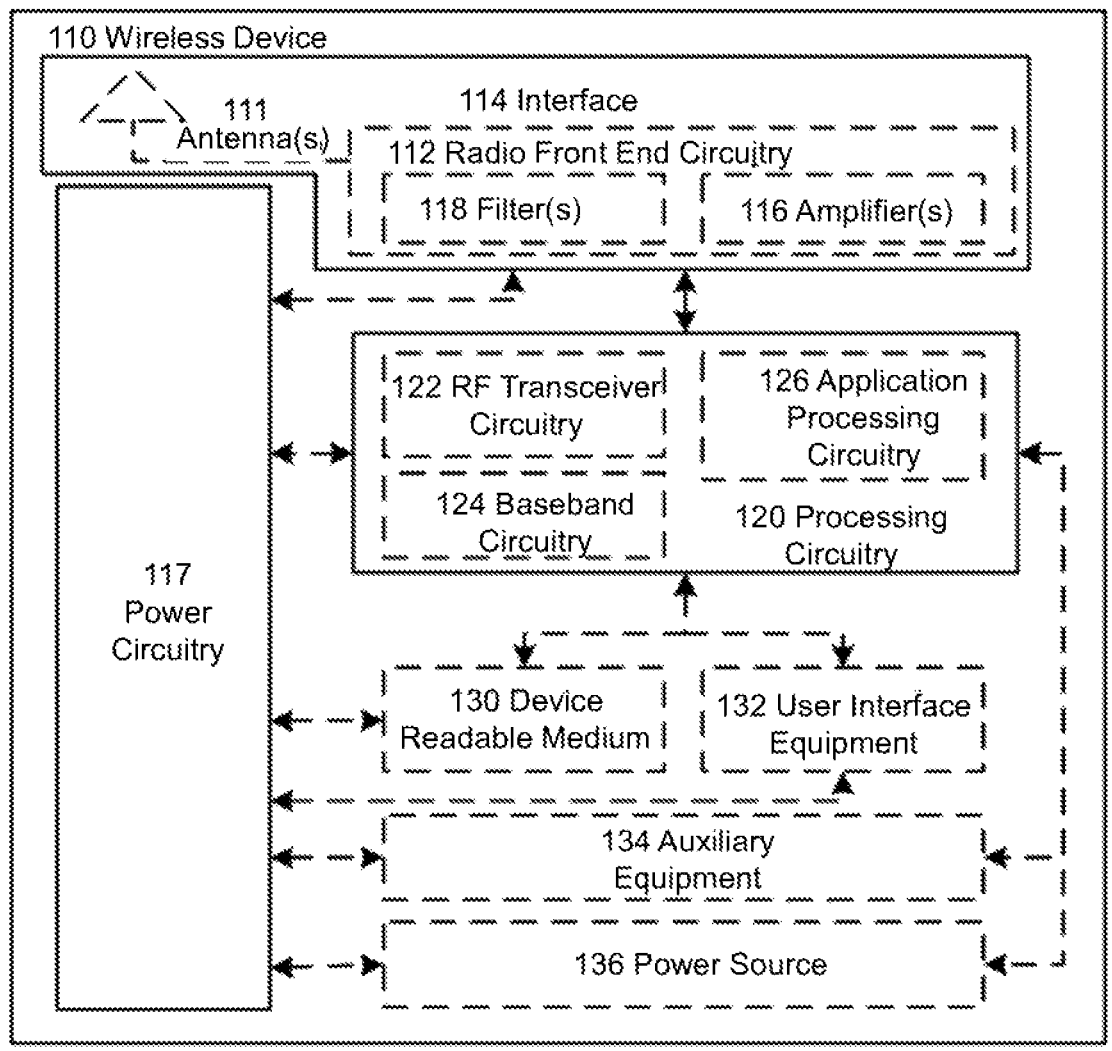
FIG. 7 illustrates an example wireless device for controlling adaptive beam measurement capability, according to certain embodiments.

FIG. 7 illustrates an example wireless device (WD), according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 8:
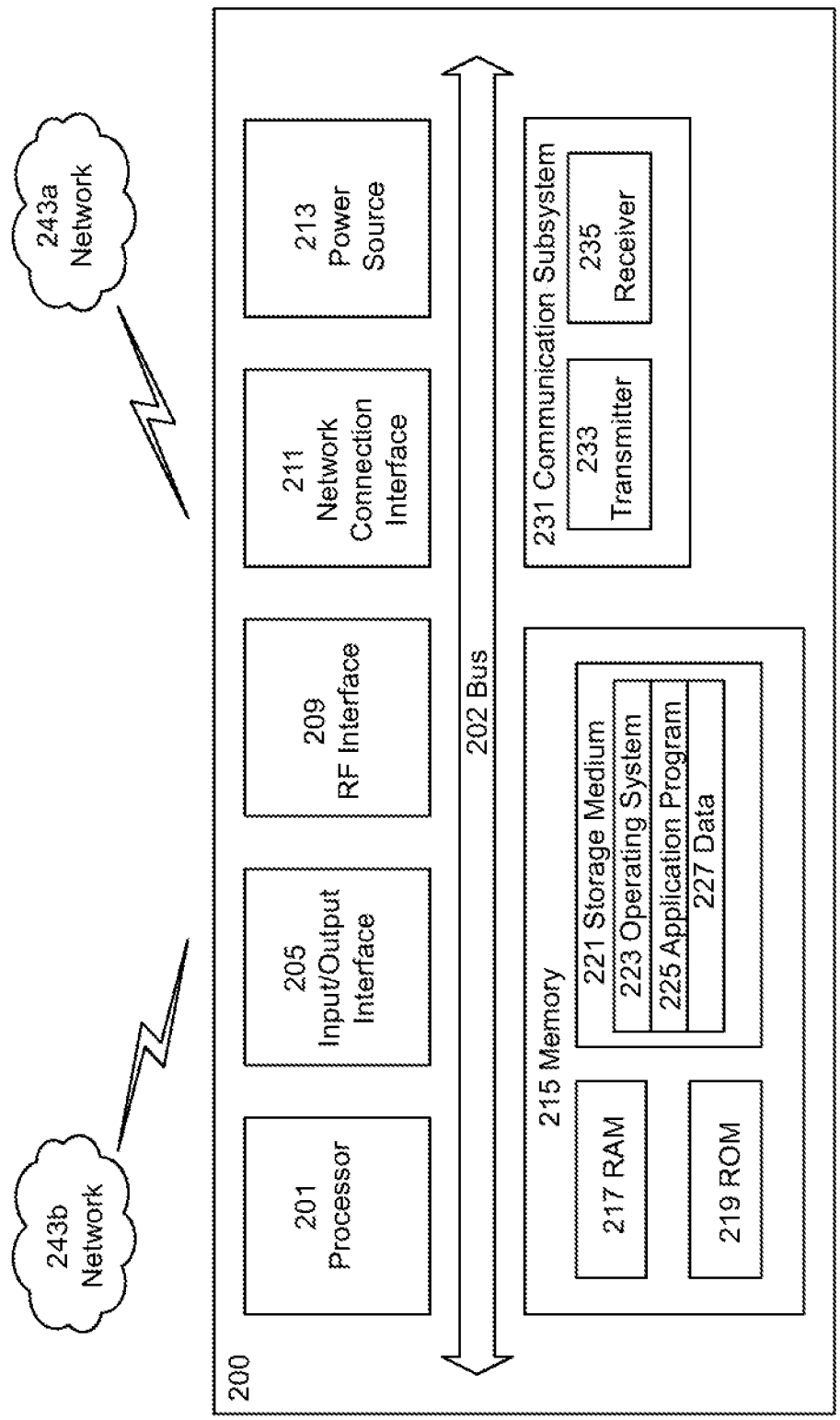
FIG. 8 illustrate an example user equipment for controlling adaptive beam measurement capability, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits, and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
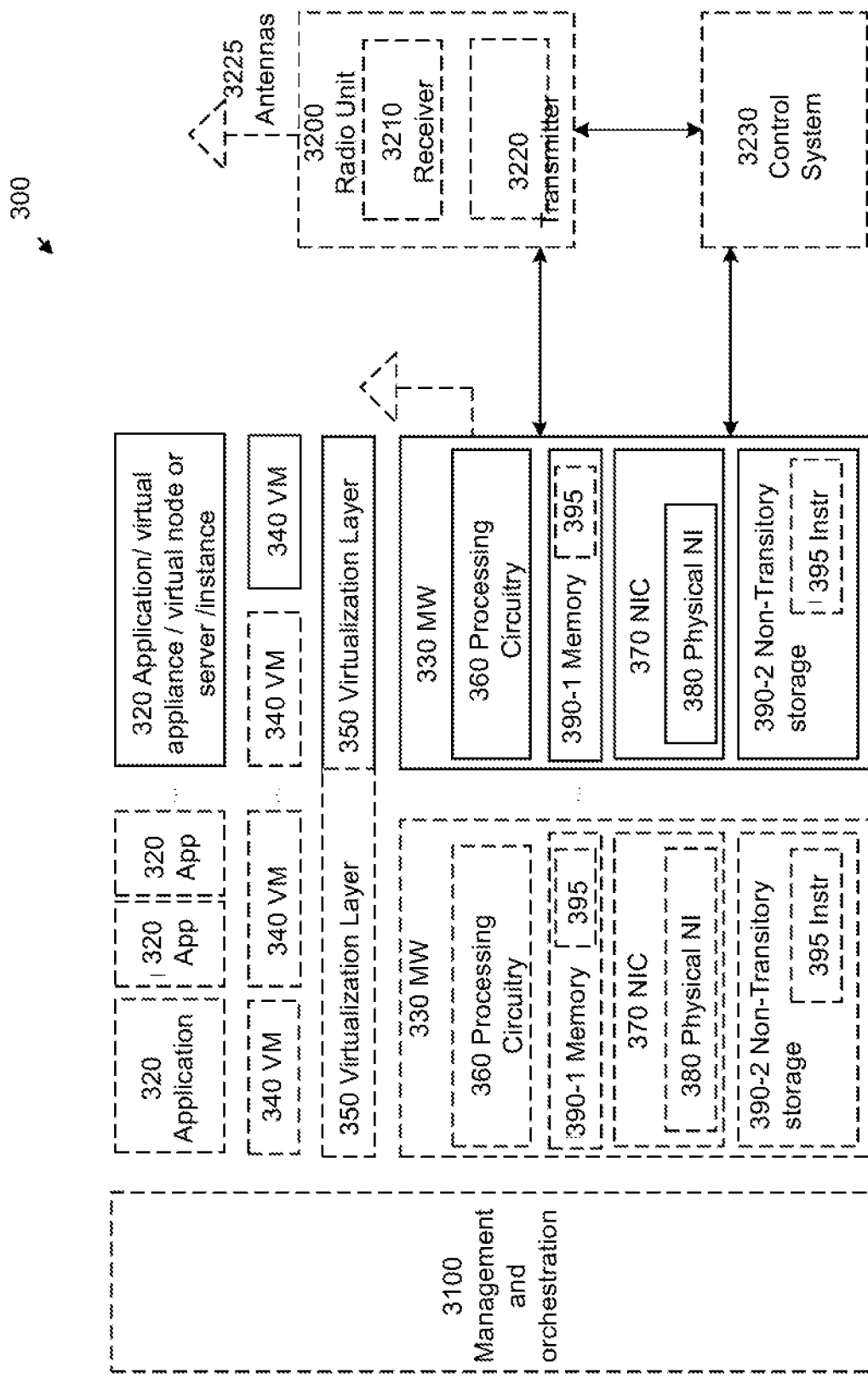
FIG. 9 illustrates an example virtualization environment in which functions implemented by some embodiments may be virtualized.

FIG. 9 is a schematic block diagram illustrating an example virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 10:
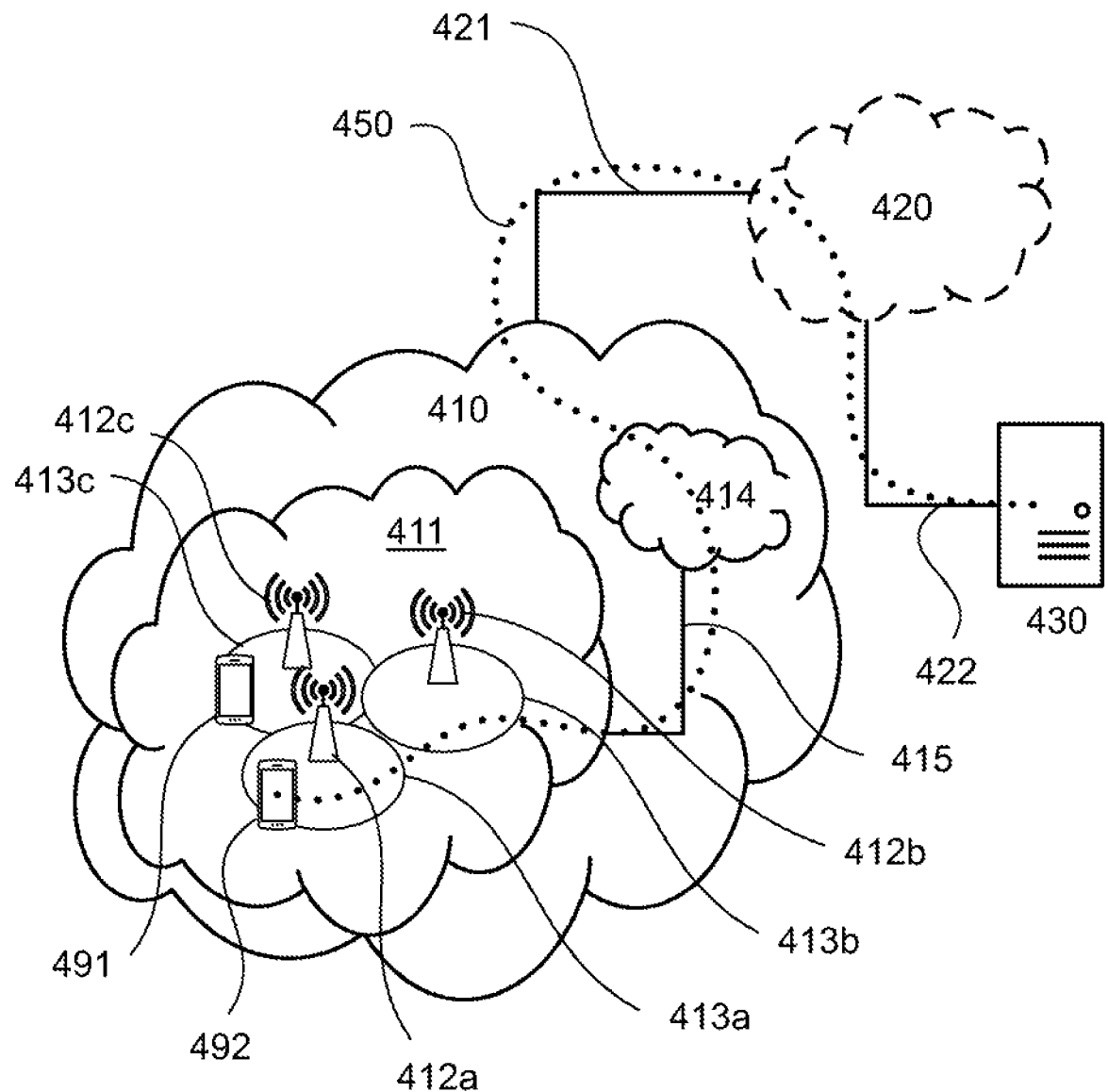
FIG. 10 illustrates a telecommunication network connected via an intermediate network to a host computer, according to certain embodiments.

FIG. 10 illustrates an example telecommunication network connected via an intermediate network to a host computer, in accordance with some embodiments. With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
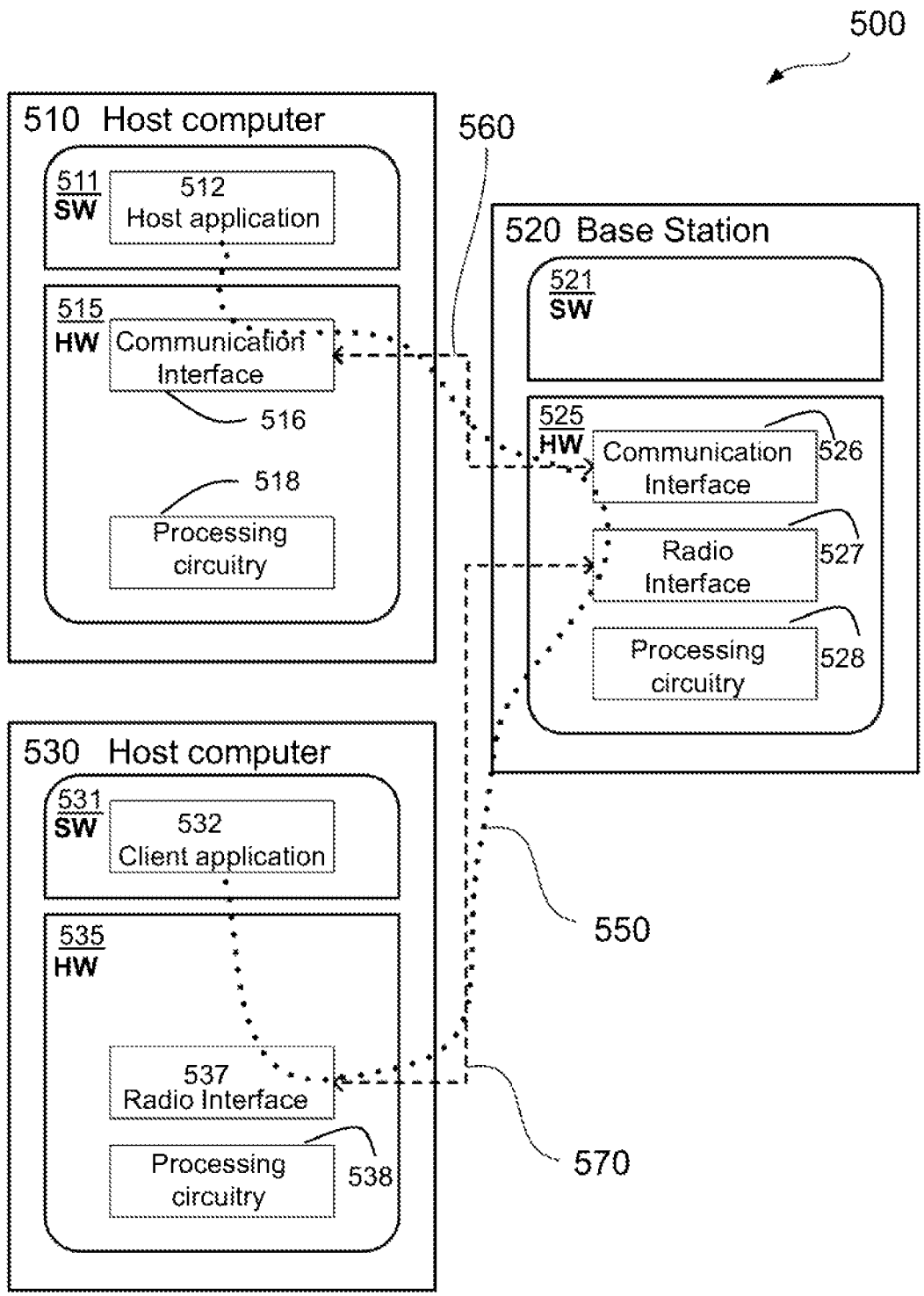
FIG. 11 illustrates a generalized block diagram of a host computer communicating via a base station with a user equipment over a partially wireless connection, according to certain embodiments.

FIG. 11 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 12, 13:
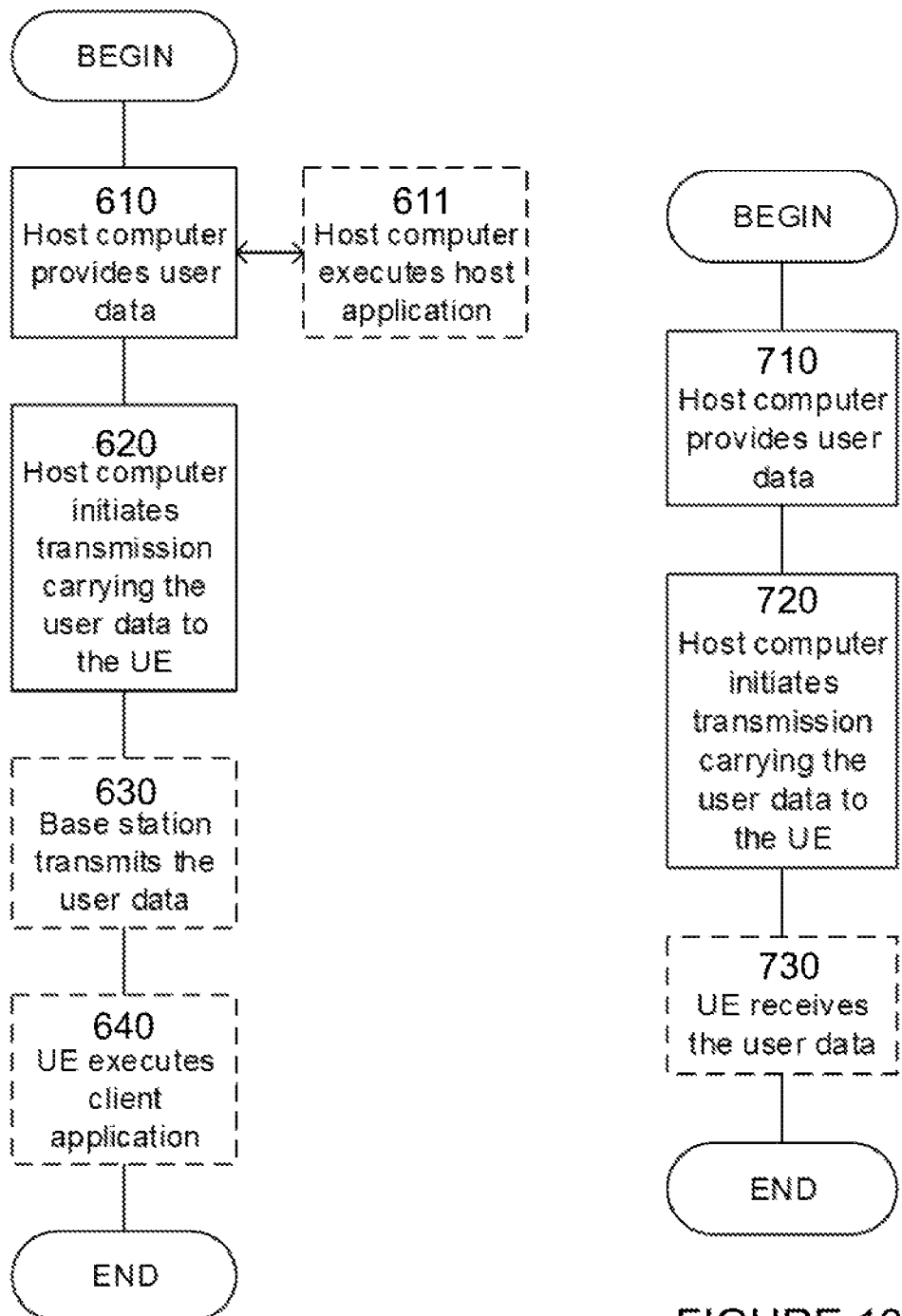
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 14, 15:
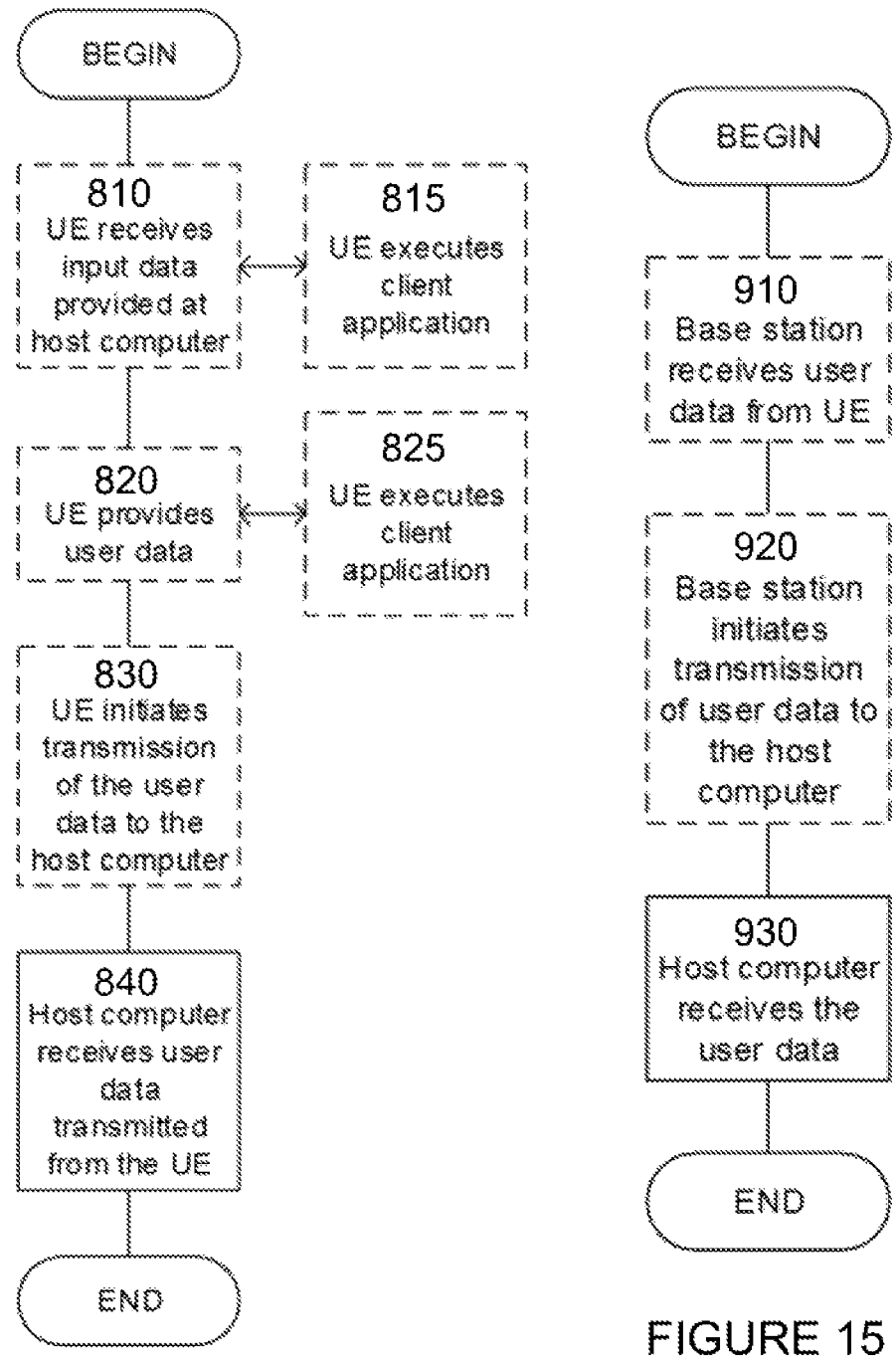
FIG. 14 illustrates another method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 16:
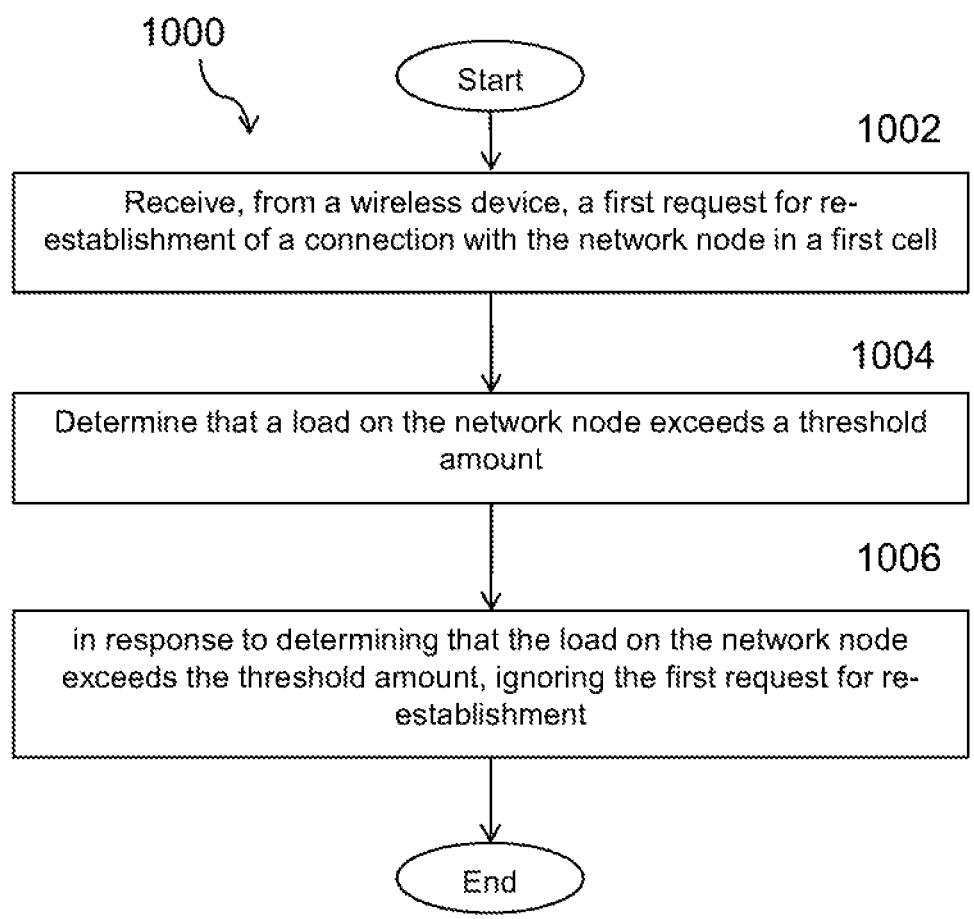
FIG. 16 illustrates an example method by a network node for handling a re-establishment request, according to certain embodiments.

FIG. 16 illustrates an example method 1000 by a network node 160 for handling a re-establishment request, according to certain embodiments. The method begins at step 1002 when the network node 160 receives, from a wireless device 110, a first request for re-establishment of a connection with the network node in a first cell. At step 1004, the network node 160 determines that a load on the network node exceeds a threshold amount. At step 1006, in response to determining that the load on network node 160 exceeds the threshold amount, network node 160 ignores the first request for re-establishment.

In a particular embodiment, the request includes an indication of a cause of failure of the connection with network node 160. Network node 160 may ignore the request for re-establishment in accordance with the indication of the cause of failure.

In a particular embodiment, determining that the load on the network node exceeds a threshold amount includes determining that the load exceeds the threshold amount at the expiration of a timer.

In a particular embodiment, network node 160 may transmit, to wireless device 110, information indicating a timer configuration indicating the threshold amount of time. For example, the information may be broadcasted via system information.

In a particular embodiment, network node 160 may transmit, to wireless device 110, information indicating an access barring class and associated reject probability for handling re-establishments in case of failure of the connection in the first cell.

In a particular embodiment, network node 160 transmits, to wireless device 110, a message indicating a rejection of the first request for the re-establishment of the connection in the first cell. In a further embodiment, the message may include a timer configuration indicating a threshold amount of time the wireless device is to wait before attempting another reestablishment of the connection with the network node in the first cell.

In a particular embodiment, the message may identify a second cell in which the wireless device should initiate a reestablishment of the connection.

In a particular embodiment, the message may be an NR RRCReestablishmentReject message.

In another particular embodiment, the message may be an RRCReject message.

Figure 17:
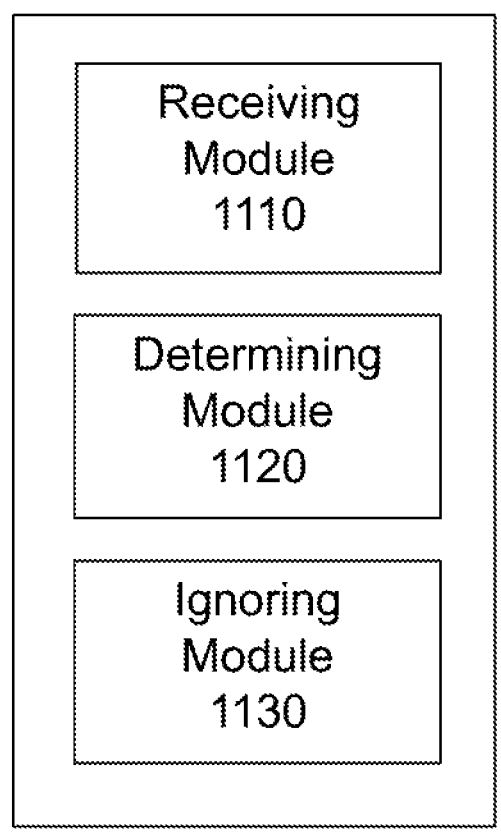
FIG. 17 illustrates an exemplary virtual computing device for handling a re-establishment request, according to certain embodiments.

In certain embodiments, the method for handling a re-establishment request as described above may be performed by a computer networking virtual apparatus. FIG. 17 illustrates an example virtual computing device 1100 for handling a re-establishment request, according to certain embodiments. In certain embodiments, virtual computing device 1100 may include modules for performing steps similar to those described above with regard to the method illustrated and described in FIG. 16. For example, virtual computing device 1100 may include at least one receiving module 1110, a determining module 1120, an ignoring module 1130, and any other suitable modules for handling a re-establishment request. In some embodiments, one or more of the modules may be implemented using processing circuitry 170 of FIG. 6. In certain embodiments, the functions of two or more of the various modules may be combined into a single module.

The receiving module 110 may perform the receiving functions of virtual computing device 1100. For example, in a particular embodiment, receiving module 1110 may receive, from a wireless device 110, a first request for re-establishment of a connection with the network node in a first cell.

The determining module 1120 may perform the determining functions of virtual computing device 1100. For example, in a particular embodiment, determining module 1120 may determine that a load on the network node exceeds a threshold amount.

The ignoring module 1130 may perform the ignoring functions of virtual computing device 1100. For example, in a particular embodiment, ignoring module 1130 may ignore the first request for re-establishment in response to determining that the load on network node 160 exceeds the threshold amount.

Other embodiments of virtual computing device 1100 may include additional components beyond those shown in FIG. 17 that may be responsible for providing certain aspects of the network node's 160 functionality, including any of the functionality described above and/or any additional functionality (including any functionality necessary to support the solutions described above). The various different types of network nodes 160 may include components having the same physical hardware but configured (e.g., via programming) to support different radio access technologies, or may represent partly or entirely different physical components.

EMBODIMENTS

Embodiment 1. A method by a network node for handling a reestablishment rejection, the method comprising:
  receiving, from a wireless device, a request for reestablishment of a connection with the network node in a first cell; and
  transmitting, to the wireless device, a message indicating a rejection of the request for reestablishment of the connection in the first cell.

Embodiment 2. The method of embodiment 1, further comprising:
  determining that a load level at the network node exceeds a threshold; and
  transmitting the message indicating the rejection of the request for reestablishment of the connection in response to determining that the load level exceeds the threshold.

Embodiment 3. The method of embodiments 1 to 2, wherein the message indicating the rejection of the request further comprises information associated with a wait timer for requiring the wireless device to wait an amount of time before attempting another reestablishment of the connection with the network node in the first cell.

Embodiment 4. The method of embodiments 1 to 3, wherein the message identifies a second cell in which the wireless device should initiate a reestablishment of the connection.

Embodiment 5. The method of embodiments 1 to 4, wherein the message is sent via SRB0.

Embodiment 6. The method of embodiments 1 to 4, wherein the message is sent via SRB1.

Embodiment 7. The method of embodiments 1 to 6, wherein the message is an NR RRCReestablishmentReject message.

Embodiment 8. The method of embodiments 1 to 6, wherein the message is an RRCReject message.

Embodiment 9. The method of embodiments 1 to 8, wherein the message is protected using at least one of integrity protection and ciphering.

Embodiment 10. A computer program comprising instructions which when executed on a computer perform any of the methods of embodiments 1 to 9.

Embodiment 11. A computer program product comprising computer program, the computer program comprising instructions which when executed on a computer perform any of the methods of embodiments 1 to 9.

Embodiment 12. A non-transitory computer readable medium storing instructions which when executed by a computer perform any of the methods of embodiments 1 to 9.

Embodiment 13. A network node comprising memory storing instructions and processing circuitry con figured to execute the instructions to cause the network node to perform any of the methods of embodiments 1 to 9.

Embodiment 14. A method by a wireless device for handling a reestablishment rejection, the method comprising:
  transmitting, to a network node, a request for reestablishment of a connection in a first cell with the network node; and
  receiving, from the network node, a message indicating a rejection of the request for reestablishment of the connection in the first cell.

Embodiment 15. The method of embodiment 14, further comprising:
  in response to receiving the message indicating the rejection of the request for reestablishment of the connection, immediately transition to IDLE mode; and
  performing network access stratum (NAS) recovery by initiating an RRC setup procedure.

Embodiment 16. The method of embodiments 14 to 15, further comprising:
  in response to receiving the message indicating the rejection of the request for reestablishment of the connection, identifying a second cell; and
  initiating a reestablishment with the second cell.

Embodiment 17. The method of embodiment 16, wherein the message identifies the second cell.

Embodiment 18. The method of embodiments 14 to 17, wherein the wireless device is subject to access barring.

Embodiment 19. The method of embodiments 14 to 18, wherein the message indicating the rejection of the request further comprises information associated with a wait timer, and the method further comprises:
  starting the wait timer, the wireless device being prohibited from attempting another reestablishment of the connection with the network node in the first cell before the expiration of the wait timer.

Embodiment 20. The method of embodiment 19, further comprising:
  determining that the wait timer has expired; and
  in response to determining that the wait timer has expired, attempting another reestablishment of the connection with the network node in the first cell.

Embodiment 21. The method of embodiment 20, further comprising:
  before the wait timer expires, identifying a second cell; and before the wait timer expires, initiating a reestablishment with the second cell.

Embodiment 22. The method of embodiments 14 to 21, wherein the message is an NR RRCReestablishmentReject message.

Embodiment 23. The method of embodiments 14 to 21, wherein the message is an RRCReject message.

Embodiment A computer program comprising instructions which when executed on a computer perform any of the methods of embodiments 14 to 23.

Embodiment 25. A computer program product comprising computer program, the computer program comprising instructions which when executed on a computer perform any of the methods of embodiments 14 to 23.

Embodiment 26. A non-transitory computer readable medium storing instructions which when executed by a computer perform any of the methods of embodiments 14 to 23.

Embodiment 27. A wireless device comprising memory storing instructions and processing circuitry con figured to execute the instructions to cause the network node to perform any of the methods of embodiments 14 to 23.

Embodiment 28. A method by a network node for handling a reestablishment rejection, the method comprising:
transmitting, to a wireless device communicating with the network node via a connection in a first cell, information indicating an access barring class and associated reject probability for handling re-establishments in case of failure of the connection in the first cell.

Embodiment 29. The method of embodiment 28, wherein the information comprises a wait time parameter indicating an amount of time during which the wireless device must wait before initiating reestablishment of the connection in response to the failure of the connection.

Embodiment 30. The method of embodiments 28 to 29, wherein the information is broadcasted via system information.

Embodiment The method of embodiments 34 to 30, further comprising:
receiving a request for re-establishment of the connection after a failure of the connection;
determining that a load on the network node exceeds a threshold amount, and
in response to determining that the load on the network node exceeds the threshold amount, ignoring the request for re-establishment.

Embodiment 32. A computer program comprising instructions which when executed on a computer perform any of the methods of embodiments 28 to 31.

Embodiment 33. A computer program product comprising computer program, the computer program comprising instructions which when executed on a computer perform any of the methods of embodiments 28 to 31.

Embodiment 34. A non-transitory computer readable medium storing instructions which when executed by a computer perform any of the methods of embodiments 28 to 31.

Embodiment 35. A network node comprising memory storing instructions and processing circuitry con figured to execute the instructions to cause the network node to perform any of the methods of embodiments 28 to 31.

Embodiment 36. A method by a wireless device for handling a reestablishment rejection, the method comprising:
receiving, from a network node with which the wireless device is communicating via a connection in a first cell, information indicating an access barring class and associated reject probability for handling re-establishments in case of failure of the connection in the first cell;
determining that the connection in the first cell has failed; and
using the information during the reestablishment of the communication in the first cell.

Embodiment 37. The method of embodiment 36, wherein the information comprises a wait time parameter indicating an amount of time during which the wireless device must wait before initiating reestablishment of the connection in response to the failure of the connection.

Embodiment 38. The method of embodiment 37, wherein using the information during the reestablishment of the communication in the first cell comprises:
starting a timer for measuring the amount of time during which the wireless device must wait before initiating reestablishment of the connection in response to the failure of the connection;
determining that the timer has expired; and
in response to determining that the timer has expired, transmitting a request for reestablishment of the connection.

Embodiment The method of embodiments 36 to 38, wherein the information is broadcasted via system information to the wireless device.

Embodiment 40. The method of embodiment 39, further comprising using the access baring parameters to re-establish the communication in a target cell.

Embodiment 41. The method of embodiments 36 to 40, wherein the information is received device via dedicated RRC signalling before a failure of the connection in the first cell.

Embodiment 42. The method of embodiments 36 to 41, further comprising performing an access barring check based on the access baring parameters included in the information.

Embodiment 43, The method of embodiment 36, further comprising:
determining that there is no re-establishment access barring parameter was broadcast with respect to a target cell; and
not applying any re-establishment parameters in the target cell.

Embodiment 44. The method of embodiment 36, further comprising informing at least one upper layer that re-establishment has failed before initiating a connection establishment procedure.

Embodiment 45. The method of embodiment 36, further comprising performing a normal IDLE to CONNECTED mode access barring check.

Embodiment 46. The method of embodiment 36, wherein using the information during the reestablishment of the communication in the first cell comprises:
transmitting a first request for reestablishment of the connection in the first cell to the network node:
Determining that the network node did not response to the request for reestablishment of the connection in the first cell; and
transmitting a second request for reestablishment of the connection in a second cell.

Embodiment 47. A computer program comprising instructions which when executed on a computer perform any of the methods of embodiments 36 to 46.

Embodiment 48. A computer program product comprising computer program, the computer program comprising instructions which when executed on a computer perform any of the methods of embodiments 36 to 46.

Embodiment 49. A non-transitory computer readable medium storing instructions which when executed by a computer perform any of the methods of embodiments 36 to 46.

Embodiment 50. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs
    receiving, from the UE, a request for reestablishment of a connection with the base station in a first cell; and
    transmitting, to the UE, a message indicating a rejection of the request for reestablishment of the connection in the first cell.

Embodiment 51. The method of embodiment 50, further comprising:
  at the base station, transmitting the user data.

Embodiment 52. The method of embodiment 51, wherein the user data is provided at the host computer by executing a host application, the method further comprising:
  at the UE, executing a client application associated with the host application.

Embodiment 53. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to:
    receive, from the UE, a request for reestablishment of a connection with the base station in a first cell; and
    transmit, to the UE, a message indicating a rejection of the request for reestablishment of the connection in the first cell.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
  1xRTT CDMA2000 1x Radio Transmission Technology
  3GPP 3rd Generation Partnership Project
  5G 5th Generation
  ABS Almost Blank Subframe
  ARQ Automatic Repeat Request
  AWGN Additive White Gaussian Noise
  BCCH Broadcast Control Channel
  BCH Broadcast Channel
  CA Carrier Aggregation
  CC Carrier Component
  CCCH SDU Common Control Channel SDU
  CDMA Code Division Multiplexing Access
  CGI Cell Global Identifier
  CIR Channel Impulse Response
  CP Cyclic Prefix
  CPICH Common Pilot Channel
  CPICH Ec/No CPICH Received energy per chip divided by the power density in the band
  CQI Channel Quality information
  C-RNTI Cell RNTI
  CSI Channel State Information
  DCCH Dedicated Control Channel
  DL Downlink
  DM Demodulation
  DMRS Demodulation Reference Signal
  DRX Discontinuous Reception
  DTX Discontinuous Transmission
  DTCH Dedicated Traffic Channel
  DUT Device Under Test
  E-CID Enhanced Cell-ID (positioning method)
  E-SMLC Evolved-Serving Mobile Location Centre
  ECGI Evolved CGI
  eNB E-U IRAN NodeB
  ePDCCH enhanced Physical Downlink Control Channel
  E-SMLC evolved Serving Mobile Location Center
  E-UTRA Evolved UTRA
  E-UTRAN Evolved UTRAN
  FDD Frequency Division Duplex
  FFS For Further Study
  GERAN GSM EDGE Radio Access Network
  gNB Base station in NR
  GNSS Global Navigation Satellite System
  GSM Global System for Mobile communication
  HARQ Hybrid Automatic Repeat Request
  HO Handover
  HSPA High Speed Packet Access
  HRPD High Rate Packet Data
  LOS Line of Sight
  LPP LTE Positioning Protocol
  LTE Long-Term Evolution
  MAC Medium Access Control
  MBMS Multimedia Broadcast Multicast Services
  MBSFN Multimedia Broadcast multicast service Single Frequency Network
  MBSFN ABS MBSFN Almost Blank Subframe
  MDT Minimization of Drive Tests
  MIB Master Information Block
  MME Mobility Management Entity
  MSC Mobile Switching Center
  NPDCCH Narrowband Physical Downlink Control Channel
  NR New Radio
  OCNG OFDMA Channel Noise Generator
  OFDM Orthogonal Frequency Division Multiplexing
  OFDMA Orthogonal Frequency Division Multiple Access
  OSS Operations Support System
  OTDOA Observed Time Difference of Arrival
  O&M Operation and Maintenance
  PBCH Physical Broadcast Channel
  P-CCPCH Primary Common Control Physical Channel
  PCell Primary Cell
  PCFICH Physical Control Format Indicator Channel
  PDCCH Physical Downlink Control Channel
  PDP Profile Delay Profile
  PDSCH Physical Downlink Shared Channel
  PGW Packet Gateway
  PHICH Physical Hybrid-ARQ Indicator Channel
  PLMN Public Land Mobile Network
  PMI Precoder Matrix Indicator
  PRACH Physical Random Access Channel
  PRS Positioning Reference Signal
  PSS Primary Synchronization Signal
  PUCCH Physical Uplink Control Channel
  PUSCH Physical Uplink Shared Channel
  RACH Random Access Channel
  QAM Quadrature Amplitude Modulation RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell

The invention claimed is:

1. A method by a network node for handling a re-establishment request, the method comprising:
receiving, from a wireless device, a first request for re-establishment of a failed connection with the network node in a first cell:
determining that a load on the network node exceeds a threshold amount; and
in response to determining that the load on the network node in the first cell exceeds the threshold amount, determining not to re-establish the failed connection with the network node in the first cell and abstaining from sending a signal to the wireless device.

2. The method of claim 1, wherein the first request comprises an indication of a cause of failure of the failed connection with the network node.

3. The method of claim 2, further comprising ignoring the first request for re-establishment in accordance with the indication of the cause of failure.

4. The method of claim 1, wherein determining that the load on the network node exceeds a threshold amount comprises determining that the load exceeds the threshold amount at the expiration of a timer.

5. The method of claim 1, further comprising:
prior to receiving the first request for re-establishment of the failed connection, transmitting, to the wireless device, information indicating a timer configuration indicating a threshold amount of time the wireless device is to wait before attempting another reestablishment of the failed connection with the network node in the first cell.

6. The method of claim 5, wherein the information is broadcasted via system information.

7. The method of claim 1, further comprising:
prior to receiving the first request for re-establishment of the failed connection, transmitting, to the wireless device, information indicating an access barring class and associated reject probability for handling re-establishments in case of failure of the failed connection in the first cell.

8. A computer program comprising instructions which when executed on a computer perform the methods of claim 1.

9. A non-transitory computer readable medium storing instructions which when executed by a computer perform to the method of claim 1.

10. A network node comprising:
memory storing instructions; and
processing circuitry configured to execute the instructions to cause the network node to:
receive, from a wireless device, a first request for re-establishment of a failed connection with the network node in a first cell:
determine that a load on the network node exceeds a threshold amount; and
in response to determining that the load on the network node in the first cell exceeds the threshold amount, determine not to re-establish of the failed connection with the network node in the first cell and abstain from sending a signal to the wireless device.

11. The network node of claim 10, wherein the first request comprises an indication of a cause of failure of the failed connection with the network node.

12. The network node of claim 11, wherein the processing circuitry is configured to execute the instructions to cause the network node to ignore the first request for re-establishment in accordance with the indication of the cause of failure.

13. The network node of claim 11, wherein, when determining that the load on the network node exceeds a threshold amount, the processing circuitry is configured to execute the instructions to cause the network node to determine that the load exceeds the threshold amount at the expiration of a timer.

14. The network node of claim 11, wherein the processing circuitry is configured to execute the instructions to cause the network node to:
prior to receiving the first request for re-establishment of the failed connection, transmit, to the wireless device, information indicating a timer configuration indicating a threshold amount of time the wireless device is to wait before attempting another reestablishment of the failed connection with the network node in the first cell.

15. The network node of claim 14, wherein the information is broadcasted via system information.

16. The network node of claim 11, wherein the processing circuitry is configured to execute the instructions to cause the network node to:
prior to receiving the first request for re-establishment of the failed connection, transmit, to the wireless device, information indicating an access barring class and associated reject probability for handling re-establishments in case of failure of the failed connection in the first cell.

* * * * *